July 18, 1933.  W. F. FABER  1,918,255

REFORMING OF NATURAL GASES

Original Filed Nov. 29, 1927  2 Sheets-Sheet 1

INVENTOR
William F. Faber
BY
Edwin A. Packard
ATTORNEY

July 18, 1933.  W. F. FABER  1,918,255
REFORMING OF NATURAL GASES
Original Filed Nov. 29, 1927    2 Sheets-Sheet 2

INVENTOR
William F. Faber
BY
Edwin A. Packard
ATTORNEY

Patented July 18, 1933

1,918,255

UNITED STATES PATENT OFFICE

WILLIAM F. FABER, OF NEWARK, NEW JERSEY, ASSIGNOR TO VICTOR N. ROADSTRUM, OF WEST ORANGE, NEW JERSEY

REFORMING OF NATURAL GASES

Original application filed November 29, 1927, Serial No. 236,453, and in Canada August 20, 1928. Divided and this application filed August 3, 1929. Serial No. 383,353.

This is a division of a main or parent application Serial No. 236,453 filed by me in the United States Patent Office, to wit, on the 29th day of November, 1927, entitled "Reforming of natural gases." This divisional application is identified as "divisional application G."

The parent application states:

"The invention according to certain aspects or objects thereof relates to the reforming or cracking of gases consisting in the main of hydrocarbons in gaseous form and particularly such gases known as natural gases or those obtained or obtainable therefrom."

As to the expression "natural gases" as embodied in the parent application—and also as employed in this divisional application—there appears the following, quoted from the parent application:

"Natural gases are obtainable from the earth in many localities. They frequently have quite different characteristics, particularly as to certain constituents thereof or entrained therein and also particularly in regard to the ratio of the varied constituents thereof or therein.

"In some places the available natural gases are used as a fuel with little or no special processing or treatment. In other places the natural gases are processed in order to remove therefrom or in order to take or obtain therefrom certain ingredients, as for the purpose of obtaining such products as gasoline. In other localities the petroleum industry has natural gases as a by-product to the liquid petroleum being sought.

"In still other localities the gasoline industry, as from the crude gasoline or wild gasoline,—and also by way of example the oil industry—has available as a by-product gases such as methane, ethane, propane, etc., which, for the purposes of the invention are natural gases. As above indicated there are derived from the crude gasoline or wild gasoline, after the latter has been separated and obtained from the original natural gases, such natural gases as propane and/or butane, as well as others. Such natural gases as those just mentioned are referred to in United States Letters Patent to Thompson No. 1,429,175, dated September 12, 1922, entitled Process of treating natural gas and products thereof.

"The expression 'natural gases' as well as the expression 'combustible natural gases' used herein is intended to indicate any of the gases above indicated as natural gases; in fact any and all gases generally known as natural gases. All such natural gases have a relatively high calorific value; for example, it is quite common to find these natural gases with a calorific value of 1200 British thermal heat units or even higher per cubic foot of gas; that is, gas at 60 degrees F. temperature and 30 inches mercury pressure.

"For certain uses it is not advisable or necessary to have this high calorific value. Moreover, in most of these natural gases all of the hydrocarbons therein are not entirely in the form of permanent gases for therein there are certain percentages of the hydrocarbons in mist or vaporous form, some of which can be condensed or liquefied by cooling alone or by cooling and pressure; or, they may be removed in other ways as, for example, by suitable absorption systems."

In the parent application as originally filed there were shown and described several different systems or specific processes and several groups of claims were accordingly presented, some being limited or particularly directed to one or more systems of the processes thereof and others being limited or particularly directed to another system or the process thereof. Consequently, the Examiner following the customary practice, in short, required the election and retention in the parent application of such claims as read on one figure or system and the process thereof and the dividing out of all claims not readable upon the elected figure or system, to wit, upon the elected specie.

The Examiner grouped the claims according to the several species or systems and the processes thereof and this divisional application has been filed in compliance with the Examiner's requirement for division to comprehend in fact or in substance the claims and inventions of group G, as outlined by the Examiner in the official action of April 25, 1929, in the parent application.

The invention of this divisional application relates to the reforming of natural gases from any suitable source of supply but within a system or by a process according to which the gases to be reformed are assisted into and through, or are caused to pass into and through, a reformer due to pumping means on the delivery side of the reformer.

According to the invention such reforming—many might call it cracking—is effected by subjecting such residue gases to a partial combustion and to the direct action of the heat of the partial combustion in a manner to convert said residue gases into a fixed combustible gas of larger total volume and lower thermal or calorific value per unit volume than the original residue gases from which it was made, and this without the production of free carbon or lamp black.

According to one aspect of the invention natural gases reformed in this manner are mixed with unreformed gases and the mixing is furthered or effected by said pumping means which is located on the delivery side of the place where the mixing takes place.

Further aspects of the invention are directed to the apparatus and equipment for carrying out or realizing the objects or aspects referred to above.

For the purpose of this invention the expression "natural gases" and the expression "combustible natural gases" are to be considered the equivalent of each other and each is to be broadly construed as covering anything which may be nothing more than a single natural combustible gas, as butane, or any gaseous substance or composition which includes in the main any one, two, or more natural combustible gases.

As illustrative of the manner in which the invention may be realized reference is made to the drawings forming a part of this specification and in which drawings, Figure 1 is an elevation partly in section showing the general arrangement of the gas reformer. The gas reformer as shown is an apparatus having a gas reforming chamber which when the apparatus is in normal operation provides a hot reforming zone wherein natural gases are reformed by a process that includes the continuous mixing of air which preferably has been preheated and the natural gases, the further heating of the mixture while conducting it toward and into the hot reforming zone and therein permitting or allowing partial combustion and cracking to take place, and continuously withdrawing the reformed gases from the apparatus. The apparatus is provided with suitable off-take piping for the withdrawing from the hot reforming zone of the reformed gases and the apparatus is preferably provided with heat interchanging means associated with the off-take piping whereby there can be a transfer of heat to the incoming air from the hot reformed gases as the latter are passing outwardly through the off-take piping. The structure providing the reforming chamber wherein the reforming zone is located is shown in vertical section in this Figure 1 and is a view taken as on the line 1—1 of Figure 2 or on line 1—1 of Figure 3 looking in the direction of the arrows.

Figure 4:
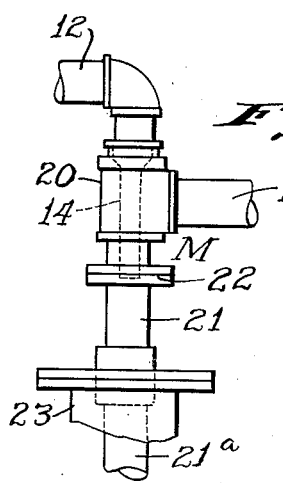

Figure 4 is a partial elevational or vertical view showing in detail the piping construction by which the preheated air and gas are mixed. This view also shows the upper portion of the pipe or conduit by which the mixture is conducted toward and into the reforming zone of the reformer, and within which pipe or conduit the mixture is further heated or superheated while in transit, and Figure 5 is a diagram of a system according to which in respect to natural gases en route to pumping means there is a portion diverted, reformed and thereafter mixed with the remaining untreated portion prior to passing through the pumping means.

Figure 5:
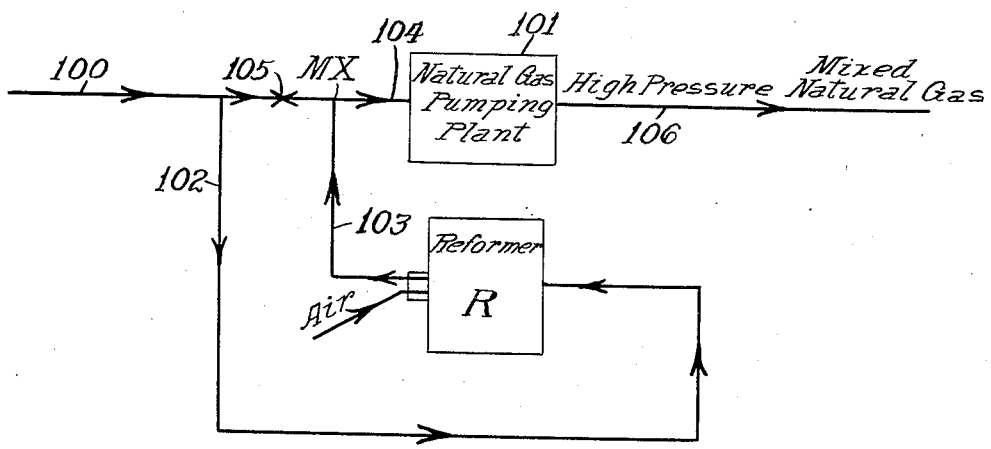

It will be here noted that Figure 5 illustrates diagrammatically how the gas reformer Figures 1 to 4, inclusive, and the reformed gas therefrom can be commercially employed. Therefore, the construction of the gas reformer of Figures 1 to 4, inclusive, mode of operation, the process carried out therein, and the types of product produced thereby and therein will be described fully and in detail before further reference is made to the arrangement and functioning of the system or plant of Figure 5. Reference will now be made to the drawings in detail.

*Gas reformer of Figures 1 to 4, inclusive*

The gas reformer or gas reforming apparatus, as the gas reforming system as a whole may be referred to, is herein designated by R. It includes the gas reforming chamber 1 which is provided with a refractory lining, as 2, that is surrounded with heat insulating material, as 3. The gas reforming chamber is provided with a gas-tight metallic casing or shell 4 having a suitable removable cover 5 held in place in any suitable manner. This casing or shell 4 is provided with suitable doors, as 6 and 7, normally closed but which can be removed or opened in order to permit access to the interior of the gas reforming chamber 1. The interior space defined by the refractory lining 2 may be referred to as a gas reforming zone or reforming zone X. The zone X as a whole is frequently referred to as the hot gas reforming zone since it is maintained hot during and by the normal functioning of the gas reforming process. There is preferably located within the zone X heat storing members, as checker work of refractory brick $b$, which with the refractory lining 2 tend to stabilize by the absorbing and giving off of heat the normal heat conditions in and for the reforming zone. It will be noted, however, as will later more fully appear, that the heat for maintaining the process is derived from the partial combustion that takes place within the reforming zone X. The general lower portion of this reforming zone X provides the hottest section of this zone and may be referred to as the hot section of the reforming zone X. The exact location of this hot section in the reforming zone is dependent largely upon the mode of operation and rate of capacity; in other words, the general location of this hot section rises as the capacity of the particular apparatus is increased.

The natural gases to be reformed may come from any suitable source of supply, as, for example, from a pressure tank designated by 8. The combustion supporting gas for supplying the oxygen used in the process, for example air, may also come to the apparatus from any suitable source of supply, as through pipe 9. The air and the gas each preferably pass from its respective source of supply through a suitable pressure regulating means, as 10 for the air and 11 for the gas. This pressure regulating means in conjunction with certain members of the mixing means M, which members are hereinafter described in detail, can be relied upon to ensure a delivery of the proper proportions of gas and air into the gas reforming zone; in other words, the construction of the pressure regulating means 10 and 11 and the mixing means M is such that the proper proportions of the gas relative to the air can always be maintained. The natural gases from the pressure tank 8 flow through the pressure regulating means 11, piping 12 having a valve 13 therein, to a constricted delivery nozzle or tip 14 providing a defined area or opening through and from which the natural gases are delivered into the hot or preheated incoming air. The air for the process flows through the pressure regulating means 10, piping 15 having a valve 16, to and through a heat interchanger 17 and from said heat interchanger 17 the heated air—frequently called the preheated air—passes through piping 18 and 19 into and through the piping T 20 which surrounds the delivery nozzle or tip 14 heretofore referred to. The hot air from T 20 passes into pipe 21 past the delivery nozzle or tip 14 and at or near the delivery end of said tip this air and gas commence to diffuse and mix and the mixed air and gas flow downwardly for a substantial distance along pipe or conduit 21 and 21a from which the mixture is delivered into the bottom of the reforming zone X.

In order that air may be delivered with velocity and sufficient accuracy as to volume to the incoming gas there is provided an orifice disk or plate 22 arranged in cooperative relation with respect to the delivery end of the nozzle or tip 14 so as to provide a defined area for the passage of the air. The air is preferably delivered at a higher velocity than the gas in order to promote an intimate and rapid mixing of the air and gases.

The mixture of gases and air which is delivered to the reforming zone X undergoes therein partial combustion and cracking, thus producing therein the ultimate desired reformed gas. The temperature within this reforming zone and the proportions of gas and air with respect to each is regulated according to the characteristics of the gases undergoing treatment and according to the characteristics desired for the reformed gases. The resulting or reformed gas passes upward from the reforming zone X into the gas off-take cross 23, through off-take piping which includes piping members 24, 25, 26, 27 and 28, a water sealing tank 29 and piping 30, and also relief piping 31 having thereupon a relief valve 32, the piping 24 constituting part of the heat interchanger 17. It will be noted that the heat from the off-going gases passing through piping 24 is readily transmitted by any suitable construction to the inflowing air passing from the piping 15 through heat interchanger 17 and piping 18 on its way to the interior of the reforming zone X. Suitable pyrometer openings—which are normally sealed and gas tight—are provided as at 33 and 34. It will here be remarked that the temperatures within the reforming zone are maintained within ranges approximating 1450 degrees F. to 1800 degrees F. dependent, as previously indicated, upon the character of the combustible gas used, the character of the gas desired and the rate of gas made. Inspection openings or "sight cocks" are provided, as at 35 and 36. These openings have suitable glass closures, as at 35' and 36', or other transparent medium whereby heat conditions within the reforming zone may be inspected by the eye.

To start up the gas reformer or the gas reforming apparatus, as the gas reforming system as a whole may be referred to, the natural gases and the air are fed through the respective conduits to the mixing device M in such proportions as to produce nearly complete combustion when the mixture is ignited, as by torch flame inserted through a sight hole as 36. During this heating up period secondary air is admitted at connections, such as 37, to furnish sufficient air for complete combustion of all the combustibles. In this way the gas reforming apparatus is quickly brought to the required reforming temperature. The combustion products resulting from the heating up process is conducted from the hot reforming zone—from the interior of the structure defining said zone— through the gas off-take piping 24, 26, 29, 31 and are allowed to escape through the relief valve 32. In short, the pipe 31 and the valve 32 may be referred to respectively as stack and stack valve. When the temperature of the gas reformer has attained the desired heat and is ready for the gas reforming process, viz., when the temperature within the reforming zone and of the structure defining the same is for example 1500 degrees F., and which temperature of 1500 degrees F. for certain gases and conditions is a normal temperature, then the proportion of combustibles and air is changed to the proper ratio, the secondary air is cut off, the stack valve 32 is closed and the reforming of the combustible natural gases commences. When normally operating the reformed gas leaves the reforming chamber passing successively through piping 24, which is within or a part of the heat interchanger 17, piping members 25, 26, 27, dip piping 28 that extends below the top of and into the water within water seal tank 29 and pipe 30 leading from the casing of the water seal construction to any desired destination. Assuming the gas reformer started up and in normal operation there will now be described somewhat in extended detail the process as actually carried out therein.

Figure 1:
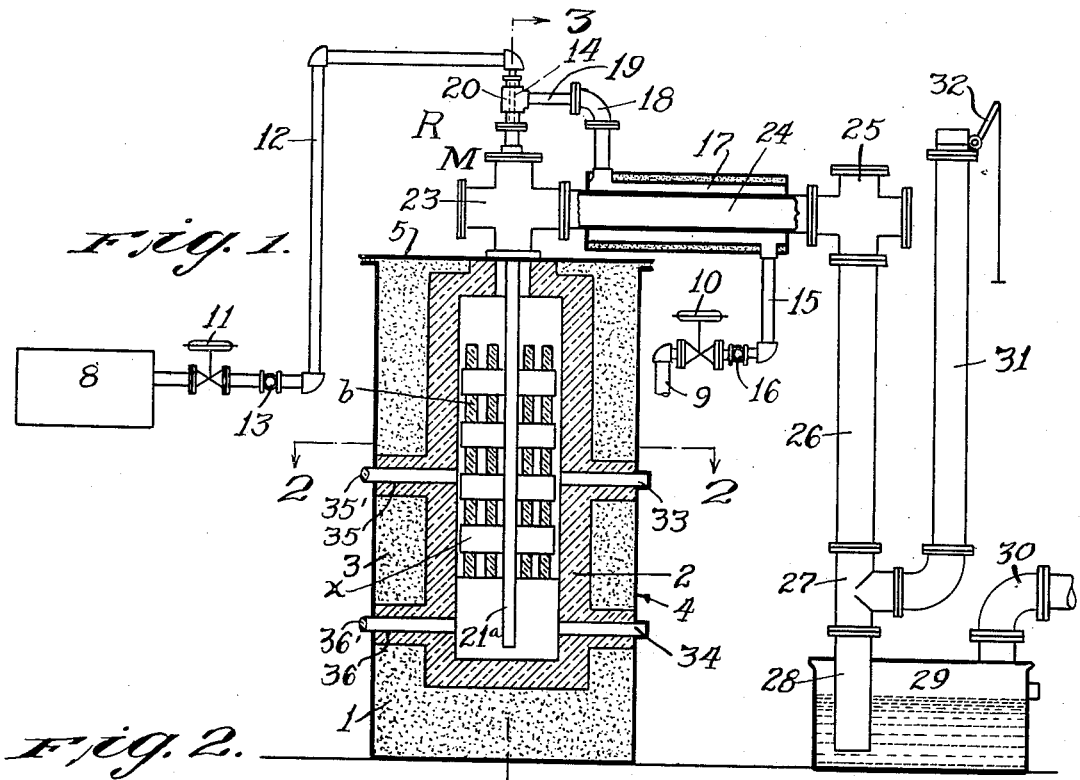
Figure 2:
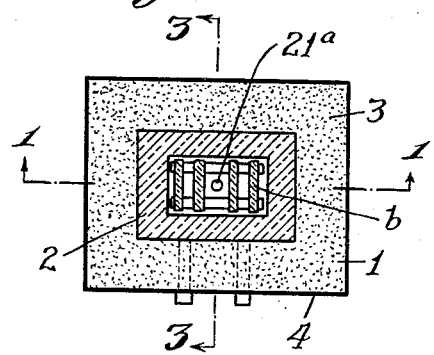
Figure 2 is a horizontal section of the structure providing the reforming chamber and is a view taken as on the line 2—2 of Figure 1 looking in the direction of the arrows.
Figure 3:
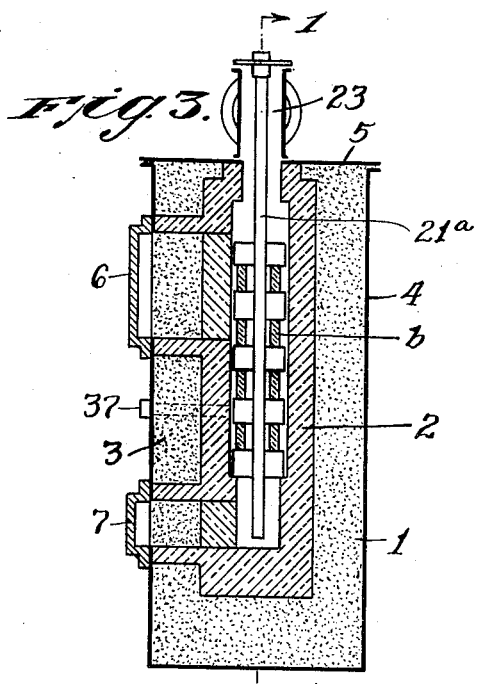
Figure 3 is a vertical section of the structure providing the reforming chamber and is a view taken as on the line 3—3 of Figure 2; it is also a section taken as on the line 3—3 of Figure 1 looking in the direction of the arrows.

The gaseous combustibles, to wit, the natural gases, and the combustion supporting gas, to wit any suitable oxygen providing gas, for example air as it exists in its natural state or when enriched or treated so that the percentage of oxygen therein is greater than that in the air when in its natural state or, for example, relatively pure oxygen should that be produced sufficiently cheap to make its use commercially practicable, are supplied—preferably continuously—from the respective supplies, through the respective conduits or piping to the mixing device M shown in Figures 1 and 4. If relatively pure oxygen is used as the oxygen providing gas, it will be necessary or advisable to employ it under certain guarded or controlled conditions so as to prevent an intense localized heating which would otherwise have a detrimental effect both upon the reforming apparatus and the process. More specifically the natural gases are continuously supplied from any suitable source, as from pressure tank 8, and flow past the pressure regulating means through piping 12 containing the valve 13, and finally leave the piping 12 through the constricted nozzle or tip 14 of the mixing device M. This nozzle or tip 14 directs the natural gases into the hot combustion supporting gas, to wit, the preheated air. The air is supplied through the piping containing the regulating valve 10. The natural gases and the air are supplied so that the ratio or proportions of the one with respect to the other remains constant. The air passes through the heat interchanger 17. In other words, in the construction shown the air passing through the heat interchanger passes around the piping 24 which is maintained hot by the heat from the outgoing hot gases leaving the reforming chamber with the result that the incoming or inflowing air is preheated by the heat imparted from the outgoing hot reformed gases.

The air thus preheated enters the T member 20 and finally leaves through a defined area, to wit, the area or space between and defined by the outside portion of the tip 14 and the orifice defining portion of the orifice disk 22. It will be noted that this defined area for the delivery of the air is near the place where the natural gases from tip 14 are delivered into the preheated air and it is at or near the place where an intimate mixing of the air and natural gases begins. Preferably the air and gases are delivered into the mixer M at different velocities and this tends to further hasten the intimate mixing. The mixture continues to travel downwardly through pipe or conduit 21 and 21a and for a substantial distance the travel within the pipe or conduit 21a is under the heating influence of the reforming zone and the hot gases therein or on their way therefrom. During this downward travel within the pipe or conduit 21a the intimate mixing continues until a relatively uniform mixture results and also on the downward travel a further substantial amount of heat is added to the mixture and the mixture may be considered as becoming superheated. The rate of downward flow is greater than the rate of flame propagation and the hot mixture when delivered from the bottom of the pipe or conduit 21a into the already hot reforming zone undergoes partial combustion that takes place within the reforming zone and which partial combustion maintains hot the reforming zone and the structure defining the reforming zone. The combustion supporting gas, to wit, air, mixed with the natural gases is supplied in such quantities as will support only a partial combustion; in other words, it is supplied in such quantities as to produce when the resulting partial combustion takes place and is effected within the reforming zone a temperature which is approximately within the range of between 1450 degrees F. and 1800 degrees F., the particular temperature being dependent primarily upon the characteristics of the natural gases being reformed, the characteristics of the natural gases desired, and the rate of operation.

The temperature of the reformer is maintained by the heat liberated from partial combustion of the gases so long as the proper portions of the natural gases and the air are held constant.

I have found by actual test that results obtained when reforming a gaseous hydrocarbon composed principally of 80% methane and 20% ethane, having a total heating value per cu. ft. of 1170 B. t. u., are as follows:

|  | Percentage by volume |
|---|---|
| Carbon dioxide | 2.1 |
| Unsaturated hydrocarbons | 1.7 |
| Oxygen | 0.5 |
| Carbon monoxide | 11.1 |
| Hydrogen | 12.8 |
| Methane | 19.7 |
| Nitrogen | 52.1 |
| B. t. u. per cu. ft. (calculated) | 320.0 |
| B. t. u. per cu. ft. (calorimeter) | 322.0 |

Temperature of reformer 1500–1700° F.
Specific gravity .78

The volume increase measured under standard condition of 60 degrees F. and 30 inches of mercury pressure was 3.33. The total heating value of the reformed gas was slightly over 90% of the heating value of the combustible natural gas, and the natural gases were converted into reformed gas without the production of free carbon in the reformer.

The results obtained when reforming propane and butane (consisting principally of propane) were as follows:

|  | Percentage by volume |
|---|---|
| Carbon dioxide | 2.1 |
| Unsaturated carbons | 6.9 |
| Oxygen | 0.1 |
| Carbon monoxide | 12.4 |
| Hydrogen | 11.6 |
| Methane | 11.3 |
| Nitrogen | 55.6 |
| B. t. u. per cu. ft. (calculated) | 345.0 |
| B. t. u. per cu. ft. (calorimeter) | 345.0 |

Temperature of reformer 1400–1600° F.

The volume increase measured under standard conditions of 60 degrees F. and 30 inches of mercury pressure was 7.1; 90% was the thermal conversion efficiency. No free carbon was produced.

The broad claims have been incorporated in the parent application and it is in order to herein point out that in the parent application it is stated:

"I believe I am the first to reform a substance or substances which is or are in gaseous form—gases—at normal temperature of 60 degrees F. and at normal atmospheric pressures, to wit, at 30 inches of mercury.

"(a) By intimately mixing such substance or substances in gaseous form, that is such gases, with a combustion supporting gas, specifically air—preferably but not necessarily preheated—and which combustion supporting gas or air is sufficient in amount to support partial combustion only or in other words is insufficient in amount to support complete combustion;

"(b) By continuously conveying such mixture toward and conducting it to a hot reforming zone—while preferably but not necessarily adding heat to said mixture being thus conducted;

"(c) By directing said mixture into the hot reforming zone and which zone is preferably maintained at a temperature within the range of approximately 1450 degrees F. to 1800 degrees F. as the result of the heat given off from and by the partial combustion which takes place within said hot reforming zone and thus producing the reformed gas within said zone without the production of lamp black or free carbon; and "(d) By withdrawing the reformed gas from the hot gas reforming zone, the withdrawing of the hot reformed gas being preferably carried out in such manner that heat is transferred from the gases being withdrawn, to wit, from the off-going gases, to the incoming combustion supporting gas—to the incoming air, that is used in or for the mixture; and it is to be understood that I claim broadly the invention which enables to be realized the reforming of and producing of such fixed combustible gases within such specified temperature range so that there is produced when the invention is realized a reformed gas of larger total volume but of lower calorific value per unit of measure than the original gases employed.

"Such gaseous substances as those preferably employed have a calorific value of 1000 to 3500 British thermal units (B. t. u.) per cubic foot at normal temperature of 60 degrees F. and normal atmospheric pressure of 30 inches of mercury, and therefrom by the process above described I am able to produce a reformed gas having a calorific value as desired of from approximately 250 to 650 B. t. u. per cubic foot at normal temperatures of 60 degrees F. and normal atmospheric pressure of 30 inches of mercury."

*System or plant or Figure 5*

The system of Figure 5 employs a gas reforming process such as fully described in connection with Figures 1 to 4, inclusive, and the gas reformer R of Figure 5 is the same in essentials of construction, function and mode of operation as the gas reformer shown and fully described in connection with Figures 1 to 4, inclusive.

This Figure 5 diagrammatically illustrates a system whereby a certain portion of natural gases, consisting largely of combustible gases such as methane and ethane, in line 100, enroute from wells or other source, through pipes 100, 105 and 104 to a pumping station 101, are diverted, conducted through line 102 to a reformer R, and treated or reformed in a manner as described in respect to Figures 1, 2, 3 and 4. The resulting reformed gases are conducted from the reformer R through line 103 to point MX in line 104 on the suction side of the pumps in the pumping station, at which point MX the untreated gases from line 100 and passing through line 104 are mixed in predetermined proportions with the reformed gases. The mixed gases are pumped by the pumps in the station 101 into the high pressure line 106 as for general distribution. Valve 105 is preferably set to regulate and produce the desired relative pressure conditions in lines 102 and 103.

In view of the explanations and descriptions already given it is believed that further elucidations in respect to the functioning and mode of operation of the system of Figure 5 are unnecessary.

From what has preceded it will be noted that the temperature of the hot reforming zone is above 1000 degrees F. and is sufficient to effect the reforming of at least a part of the material undergoing treatment under the direct influence of the heat of the partial combustion that takes place in the hot reforming zone, without the production of carbon black—sometimes referred to as lamp black—and that from the reforming zone there is a withdrawal of the fluid products resulting from the process. It will be further pointed out that in certain instances the materials used in the process may be referred to as an admixed material consisting mainly of a paraffin hydrocarbon substance lighter than pentane and which is mixed with combustion supporting gas. Those paraffin hydrocarbons sometimes referred to as lighter than pentane are such as butane, propane, ethane and methane, or mixtures thereof.

The improvements herein set forth are not limited to the precise construction and arrangement shown and described for it will be appreciated that they may be realized in various forms, ways and modifications without departing from the spirit and scope of the invention.

What is claimed is:

1. A system according to which there are included and arranged in cooperative relationship a pumping means, a pipe line thereto through which natural gas passes while en route to the pumping means, said pipe line having a gas mixing means constituting a part thereof, gas reforming means, means for conducting gas to be reformed from said pipe line but from a point ahead of said gas mixing means to said gas reforming means, means for supplying combustion supporting gas as air to said gas reforming means for the purpose of supporting partial combustion essential for the carrying out of the gas reforming process in the gas reforming means, said gas reforming means being constructed so as to continuously carry out therein a gas reforming process dependent for its functioning upon partial combustion for the production of the reformed gas and without the production of free carbon and which reformed gas thus produced therein is a fixed combustible gas of lower calorific value per unit volume and of larger volume than the natural gas from which it was produced, means for conducting reformed gas from the gas reforming means to said gas mixing means whereby the pumping means pumps from the gas mixing means a mixture of reformed gas and of natural gas which has not been reformed.

2. A system according to which there are included and arranged in cooperative relationship a line providing an initial gas supply means for supplying natural gas, gas reforming means, a line extending from the initial supply means to said gas reforming means and through which said last mentioned line a portion of the natural gas is conducted from the initial gas supply means to the gas reforming means, means for supplying combustion supporting gas as air to said gas reforming means for the purpose of supporting partial combustion essential for the carrying out of the gas reforming process in the gas reforming means, said gas reforming means being constructed so as to continuously carry out therein a gas reforming process dependent for its functioning upon partial combustion for the production of the reformed gas and without the production of free carbon and which reformed gas thus produced therein is a fixed combustible gas of lower calorific value per unit volume and of larger volume than the natural gas from which it was produced, means providing a mixing point and constituting a mixing means, a line extending from the gas reforming means to the mixing means and through which line reformed gas is conducted from the gas reforming means to the mixing point, a line extending from the initial gas supply means to the mixing means and through which line gas is conducted from the initial gas supply means to the mixing point, and a line leading from the mixing means and comprising a pump for pumping gas into and through the mixing means.

WILLIAM F. FABER.